(12) United States Patent
Takeuchi et al.

(10) Patent No.: US 12,181,015 B2
(45) Date of Patent: Dec. 31, 2024

(54) DAMPER

(71) Applicant: KAWASAKI JUKOGYO KABUSHIKI KAISHA, Kobe (JP)

(72) Inventors: Ryota Takeuchi, Kobe (JP); Hidetsugu Ishimaru, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 81 days.

(21) Appl. No.: 18/010,605

(22) PCT Filed: Jun. 10, 2021

(86) PCT No.: PCT/JP2021/022115
§ 371 (c)(1),
(2) Date: Dec. 15, 2022

(87) PCT Pub. No.: WO2021/256372
PCT Pub. Date: Dec. 23, 2021

(65) Prior Publication Data
US 2023/0258240 A1   Aug. 17, 2023

(30) Foreign Application Priority Data

Jun. 15, 2020 (JP) .................. 2020-102877

(51) Int. Cl.
*F16F 15/023* (2006.01)
*F01D 25/16* (2006.01)
(Continued)

(52) U.S. Cl.
CPC ........ *F16F 15/0237* (2013.01); *F01D 25/164* (2013.01); *F16C 27/045* (2013.01); *F16C 35/077* (2013.01)

(58) Field of Classification Search
CPC ...... F16C 27/02; F16C 27/045; F16C 35/077; F01D 25/164; F01D 15/0237
See application file for complete search history.

(56) References Cited

U.S. PATENT DOCUMENTS 4,872,767 A   10/1989   Knapp
5,531,522 A   7/1996    Ide et al.
(Continued)

FOREIGN PATENT DOCUMENTS

CN   110566614 A   12/2019
JP   S61-262222 A   11/1986
(Continued)

OTHER PUBLICATIONS

Machine Translation of JP-2010203504-A (Year: 2010).*

*Primary Examiner* — Alan B Waits
(74) *Attorney, Agent, or Firm* — Oliff PLC

(57) ABSTRACT

A damper includes: cylindrical damper body, damper body including inner ring and outer ring located concentrically, arc springs located side by side in circumferential direction between inner and outer rings, and slits that separate inner ring, outer ring, and arc springs; sealers on both sides of damper body in axial direction, sealers including sealing surfaces, sealing surfaces facing open ends of slits in axial direction, with gaps between sealing surfaces and open ends of slits; and viscous fluid that fills slits and gaps. Arc springs include first arc spring and second arc spring located side by side in circumferential direction. Each slit includes: inner slit portion that separates first arc spring and inner ring; outer slit portion that separates second arc spring and outer ring; connecting portion that connects inner slit and outer slit portions. Connecting portion includes restrictor that restricts viscous fluid movement between inner and outer slit portions.

9 Claims, 7 Drawing Sheets

(51) Int. Cl.
 *F16C 27/04* (2006.01)
 *F16C 35/077* (2006.01)

(56) References Cited

U.S. PATENT DOCUMENTS

| | | | |
|---|---|---|---|
| 9,879,720 B2* | 1/2018 | Ertas | F01D 25/164 |
| 2009/0263057 A1* | 10/2009 | Kanki | B23H 9/00 |
| | | | 384/99 |
| 2020/0116200 A1 | 4/2020 | Verrelst et al. | |

FOREIGN PATENT DOCUMENTS

| | | |
|---|---|---|
| JP | H07-505945 A | 6/1995 |
| JP | H11-141545 A | 5/1999 |
| JP | 2007-56976 A | 3/2007 |
| JP | 2010-203504 A | 9/2010 |
| JP | 2015-124838 A | 7/2015 |
| JP | 2019-100414 A | 6/2019 |

* cited by examiner

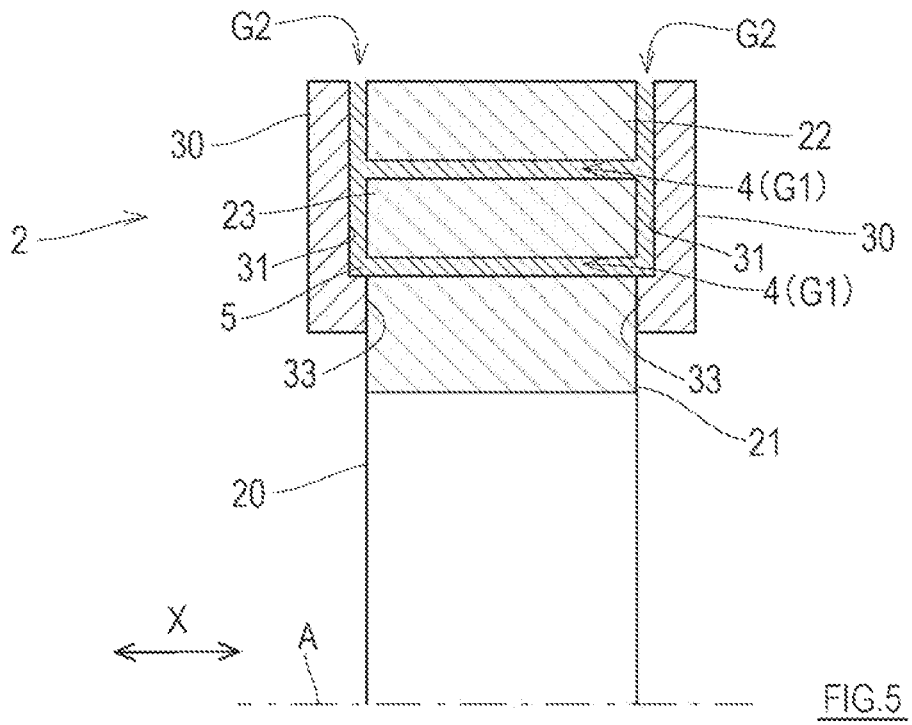
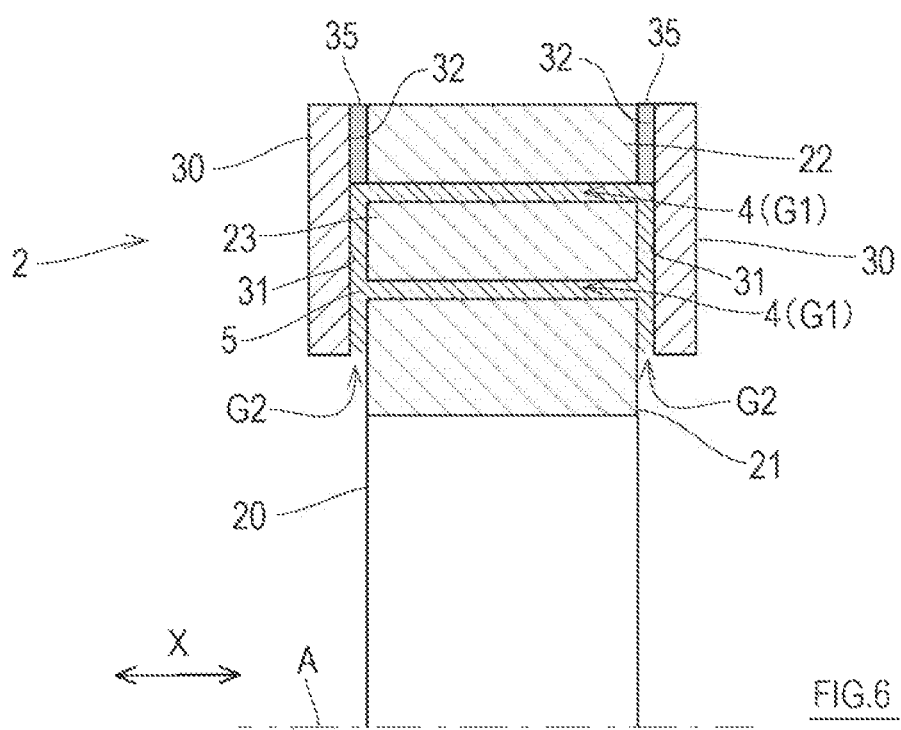

DAMPER

CROSS-REFERENCE TO RELATED APPLICATIONS

This is a U.S. National Phase Application of PCT/JP2021/022115 filed on Jun. 10, 2021, which designates the United States and claims priority to Japanese Patent Application No. 2020-102877, filed Jun. 15, 2020, the entire contents of which are incorporated herein by reference.

TECHNICAL FIELD

The present disclosure relates to the structure of a damper that is, in various rotating machines such as a jet engine, a turbo compressor, and a turbocharger, located between a rotating shaft and a support, the damper serving to damp vibration that is transmitted from the rotating shaft to the support.

BACKGROUND ART

It has been known that, in various rotating machines, a squeeze film damper (or a squeeze film damper bearing) is used between a rotating shaft and a support in order to damp vibration that is transmitted from the rotating shaft to the support. The squeeze film damper forms a viscous fluid film between the rotating shaft (or bearing) and a fixing surface that supports the rotating shaft (or bearing). Vibration of the rotating shaft is damped by flowing movement and compression of the viscous fluid. Patent Literatures 1 and 2 each disclose this type of squeeze film damper.

Patent Literature 1 discloses a bearing damper element. The bearing damper element is located between a rotating shaft and a support, and includes a cylindrical body fixed to the support. There is a slit between the inner surface and the outer surface of the cylindrical body. The slit is machined by wire-cut electrical discharge machining or laser machining. The slit is filled with a viscous fluid. There are sealers adjacent to both end surfaces of the cylindrical body in an axial direction, respectively. There are minute gaps between the sealers and the end surfaces of the cylindrical body. Since the sealers suppress the viscous fluid from flowing out of open ends of the slit in the axial direction, the flow resistance of the viscous fluid increases, which makes it possible to increase the damping force.

Patent Literature 2 discloses a squeeze film damper bearing. The squeeze film damper bearing includes: a hollow cylindrical inner ring that supports a rotating shaft or a bearing; a hollow cylindrical outer ring that is in close contact with, and fixed to, the bearing or a fixing surface; and three or more middle arc portions located at regular intervals in a circumferential direction between the inner ring and the outer ring, the middle arc portions being separated from each other by slits. One end of each middle arc portion in the circumferential direction is integrally coupled to the outer ring, and the other end of each middle arc portion in the circumferential direction is integrally coupled to the inner ring.

CITATION LIST

Patent Literature

PTL 1: Japanese Laid-Open Patent Application Publication No. 2007-56976

PTL 2: Japanese Laid-Open Patent Application Publication No. 2010-203504

SUMMARY OF INVENTION

Technical Problem

In the squeeze film dampers configured as above, by increasing the viscous resistance of the viscous fluid by reducing the slit width (the slit dimension in a radial direction), the vibration damping effect can be increased. However, the reduction in the slit width causes disadvantages, such as the following. First, the damping characteristics of the damper become more susceptible to static eccentricity and vibration amplitude of the rotating shaft. Secondly, in the case of machining the slit in the cylindrical body by wire-cut electrical discharge machining as described in Patent Literature 1, since the diameter of a wire is reduced in accordance with the reduction in the slit width, the machining current needs to be reduced. Consequently, the machining time is prolonged, which causes an increase in manufacturing cost.

The present disclosure has been made in view of the above-described problems. An object of the present disclosure is to propose a structure of a damper, the structure making it possible to, in the damper, increase the slit width of a slit (the slit is a gap in which a viscous fluid film is formed by a viscous fluid) compared to conventional art while maintaining or improving vibration damping characteristics.

Solution to Problem

A damper according to one aspect of the present disclosure includes: a damper body that is cylindrical, the damper body including an inner ring and an outer ring that are concentrically located, arc springs that are located side by side in a circumferential direction between the inner ring and the outer ring, and slits that separate the inner ring, the outer ring, and the arc springs from each other; sealers located on both sides of the damper body in an axial direction, respectively, the sealers including sealing surfaces, respectively, the sealing surfaces facing open ends of the slits in the axial direction, with gaps present between the sealing surfaces and the open ends of the slits; and a viscous fluid that fills the slits and the gaps. The arc springs include a first arc spring and a second arc spring that are located side by side in the circumferential direction. Each of the slits includes: an inner slit portion that separates the first arc spring and the inner ring from each other; an outer slit portion that separates the second arc spring and the outer ring from each other; and a connecting portion that connects the inner slit portion and the outer slit portion. The connecting portion includes a restrictor that restricts movement of the viscous fluid between the inner slit portion and the outer slit portion.

The damper configured as above includes a fluid film that is continuous in the slits and the gaps (the gaps are hereinafter referred to as "end seal gaps"). When the rotating shaft vibrates due to its rotation, pressure derived from the viscosity of the viscous fluid occurs in the fluid film in the slits. Accordingly, vibration damping (so-called squeeze damping) occurs. Also, when the rotating shaft vibrates due to its rotation, viscous resistance occurs in the fluid film in the end seal gaps. Consequently, vibration damping by energy dissipation (so-called dashpot damping) occurs. In the damper configured as above, the movement of the viscous fluid from the inner slit portion to the outer slit portion (or from the outer slit portion to the inner slit portion) is restricted by the restrictor of the connecting portion of each slit. Accordingly, the viscous fluid in the slits is led to the end seal gaps due to the vibration of the rotating shaft. This makes it possible to cause vibration damping effectively. Therefore, even in a case where the slit width of the slits is set greater than the slit width in conventional dampers and thereby the squeeze damping effect exerted by the slits is lowered, the dashpot damping effect exerted by the end seal gaps will compensate for the insufficiency in the vibration damping effect, or even improve the vibration damping effect. In other words, in the damper configured as above, the slit width of the slits can be increased compared to the slit width in conventional dampers while maintaining or improving vibration damping characteristics compared to conventional dampers.

A damper according to another aspect of the present disclosure includes: a damper body that is cylindrical, the damper body including an inner ring and an outer ring that are concentrically located, arc springs that are located side by side in a circumferential direction between the inner ring and the outer ring, and slits that separate the inner ring, the outer ring, and the arc springs from each other; sealers located on both sides of the damper body in an axial direction, respectively, the sealers including sealing surfaces, respectively, the sealing surfaces facing open ends of the slits in the axial direction, with gaps present between the sealing surfaces and the open ends of the slits; and a viscous fluid that fills the slits and the gaps. The damper body includes at least one fluid feeding hole that extends in a radial direction from an outer surface of the outer ring, communicates with at least one of the slits, and feeds the viscous fluid to the at least one of the slits. The fluid feeding hole includes a reverse flow preventer that prevents a reverse low of the viscous fluid from the at least one of the slits to the fluid feeding hole.

The damper configured as above includes a fluid film that is continuous in the slits and the gaps (the gaps are hereinafter referred to as "end seal gaps"). When the rotating shaft vibrates due to its rotation, pressure derived from the viscosity of the viscous fluid occurs in the fluid film in the slits. Accordingly, vibration damping (so-called squeeze damping) occurs. Also, when the rotating shaft vibrates due to its rotation, viscous resistance occurs in the fluid film in the end seal gaps. Consequently, vibration damping by energy dissipation (so-called dashpot damping) occurs. In the damper configured as above, since the reverse flow of the viscous fluid into the fluid feeding hole from the inside of the slit(s) is restricted, the viscous fluid in the slit(s) is led to the end seal gaps due to the vibration of the rotating shaft, and this makes it possible to cause vibration damping effectively. Therefore, even in a case where the slit width of the slits is set greater than the slit width in conventional dampers and thereby the squeeze damping effect exerted by the slits is lowered, the dashpot damping effect exerted by the end seal gaps will compensate for the insufficiency in the vibration damping effect, or even improve the vibration damping effect. In other words, in the damper configured as above, the slit width of the slits can be increased compared to the slit width in conventional dampers while maintaining or improving vibration damping characteristics compared to conventional dampers.

Advantageous Effects of Invention

According to the present disclosure, the slit width of the slits in the damper can be increased compared to the slit width in conventional dampers while maintaining or improving vibration damping characteristics compared to conventional dampers.

BRIEF DESCRIPTION OF DRAWINGS

FIG. 5 is a sectional view of a part of the damper, the sectional view illustrating a second configuration example of the end seal gaps.

FIG. 6 is a sectional view of a part of the damper, the sectional view illustrating a third configuration example of the end seal gaps.

DESCRIPTION OF EMBODIMENTS

Next, an embodiment of the present disclosure is described with reference to the drawings. In each drawing, common components (parts, portions) among the drawings are denoted by the same reference signs, and repeating the same descriptions is avoided below.

Figure 1:
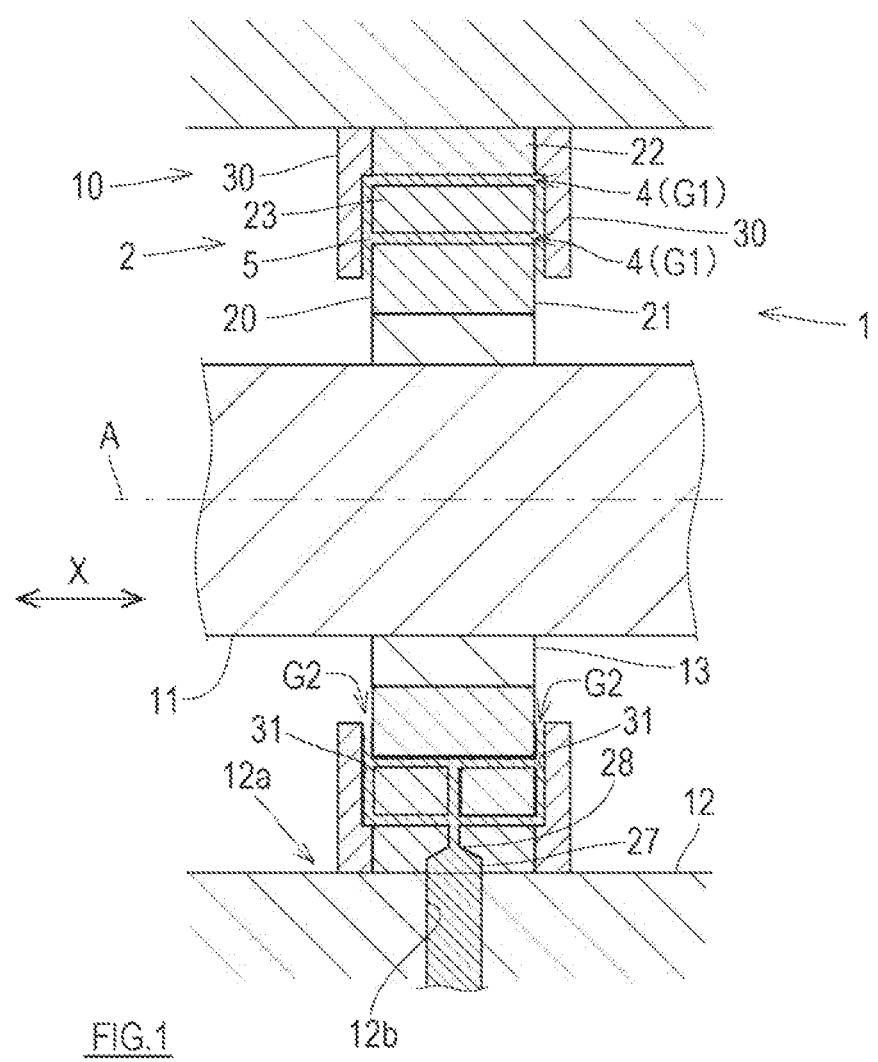
FIG. 1 is a sectional side view of a rotating shaft support of a rotating machine including a damper according to one embodiment of the present disclosure.

FIG. 1 is a sectional side view of a rotating shaft support 10 of a rotating machine 1 including a damper 2 according to the present embodiment. The damper 2 according to the present disclosure is applicable to, for example, any of various rotating machines, such as a jet engine, a turbo compressor, or a turbocharger.

The rotating machine 1 shown in FIG. 1 includes: a rotating shaft 11; a housing 12, which serves as a support for the rotating shaft 11; and a bearing 13. The rotating shaft 11 is rotatably supported on the housing 12 by the bearing 13, which is located between the rotating shaft 11 and the housing 12. The bearing 13 may be either a rolling bearing or a plain bearing.

The rotating machine 1 further includes the damper 2. The damper 2 has a function of centering the rotating shaft 11 as well as a function of damping the vibration of the rotating shaft 11. In the present embodiment, the damper 2 is located between the outer periphery of the bearing 13 and the inner periphery of the housing 12. Alternatively, the damper 2 may be located between the outer periphery of the rotating shaft 11 and the inner periphery of the bearing 13. Further alternatively, in a case where the bearing 13 is a rolling bearing including an inner ring, an outer ring, and a rolling element, the damper 2 may be configured as a part of the outer ring, or a part of the inner ring, of the bearing 13. Further alternatively, in a case where the bearing 13 is a plain bearing, the damper 2 may be configured as a part of the bearing 13.

The damper 2 includes a damper body 20, sealers 30, and a viscous fluid 5. The damper body 20 has a hollow cylindrical shape. Hereinafter, for the sake of convenience of the description, the rotational axis of the damper body 20 as a solid figure (a solid of revolution) is referred to as "the damper axis A"; the axial direction X of the damper axis A is parallel to the axial direction of the rotating shaft 11; the radial direction of a circle whose center is the damper axis A is referred to as "the radial direction"; and the circumferential direction of the circle whose center is the damper axis A is referred to as "the circumferential direction".

The outer surface of the damper body 20 is in close contact with, and fixed to, a cylindrical support 12a of the housing 12. The damper body 20 does not rotate together with the rotating shaft 11, and allows the rotating shaft 11 to rotate about its center axis at a predetermined high speed. The damper body 20 includes an inner ring 21, an outer ring 22, and four arc springs 23. The inner ring 21 and the outer ring 22 each have a hollow cylindrical shape. The outer ring 22 and the inner ring 21 are concentrically located about the damper axis A, such that the outer periphery of the inner ring 21 and the inner periphery of the outer ring 22 are spaced apart from each other in the radial direction.

Figure 2:
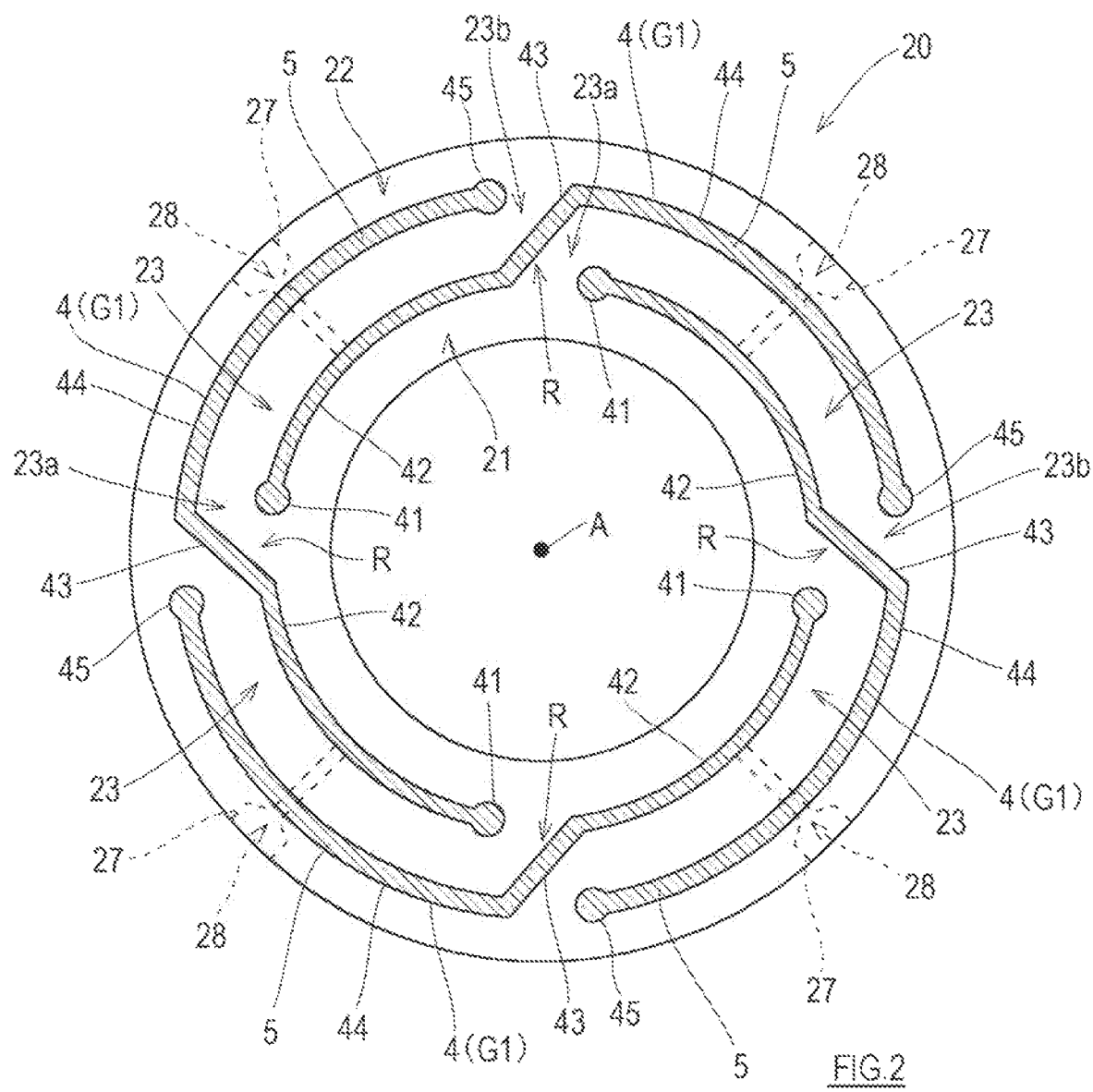
FIG. 2 shows a damper body as seen in an axial direction.

FIG. 2 shows the damper body 20 as seen in the axial direction X. As shown in FIG. 1 and FIG. 2, the four arc springs 23 are located between the inner ring 21 and the outer ring 22, which are spaced apart from each other in the radial direction. The four arc springs 23 are located side by side in the circumferential direction at substantially regular intervals. Each arc spring 23 is an arc-shaped component. The inner surface and the outer surface of the arc spring 23 are each an arc surface whose center is the damper axis A. The inner ring 21, the outer ring 22, and the arc springs 23 are, as a whole, a single component although the inner ring 21, the outer ring 22, and the arc springs 23 are partly separated from each other by the four slits 4. The inner surfaces of the arc springs 23 face the outer surface of the inner ring 21, with the slits 4 located between the outer surface of the inner ring 21 and the inner surfaces of the arc springs 23. The outer surfaces of the arc springs 23 face the inner surface of the outer ring 22, with the slits 4 located between the inner surface of the outer ring 22 and the outer surfaces of the arc springs 23. Each arc spring 23 includes a first end 23a and a second end 23b. The first end 23a is one end of the arc spring 23 in the circumferential direction, and the second end 23b is the other end of the arc spring 23 in the circumferential direction. The first end 23a of each arc spring 23 is connected to the inner ring 21. The second end 23b of each arc spring 23 is connected to the outer ring 22.

Each slit 4 includes a first end hole 41, an inner slit portion 42, a connecting portion 43, an outer slit portion 44, and a second end hole 45, which are continuous in this order. The slits 4 penetrate the damper body 20 in the axial direction X. The second end hole 45 is positioned toward the outer peripheral side relative to the first end hole 41. The first end hole 41 and the second end hole 45 serve to reduce stress that occurs in the damper body 20. The first end hole 41 and the second end hole 45 are holes that first receive a wire therein at the time of machining the slit 4 in a cylindrical raw material of the damper body 20 by wire-cut electrical discharge machining.

The inner slit portion 42 is arc-shaped such that it extends in the circumferential direction from the first end hole 41.

The outer slit portion 44 is arc-shaped such that it extends in the circumferential direction from the inner slit portion 42. In a case where, among the arc springs 23, those that are adjacent to each other in the circumferential direction are referred to as a "first arc spring" and a "second arc spring", the inner slit portion 42 of one slit 4 separates the first arc spring and the inner ring 21 from each other, and the outer slit portion 44 of the one slit 4 separates the second arc spring and the outer ring 22 from each other. As thus described, the inner slit portion 42 and the outer slit portion 44 of each slit 4 are shifted from each other in the circumferential direction, and also shifted from each other in the radial direction. The connecting portion 43 connects the inner slit portion 42 and the outer slit portion 44 in the circumferential direction. The direction in which the connecting portion 43 extends includes a radial direction component and a circumferential direction component.

Each slit 4 is a "squeeze gap G1". In each slit 4, a fluid film (a squeeze film) is formed by the viscous fluid 5, which fills the slit 4. The viscous fluid 5 is not particularly limited, but may be lubricating oil, for example.

There are fluid feeding holes 27 on the outer surface of the damper body 20. Each fluid feeding hole 27 extends in the radial direction. In the present embodiment, on the outer surface of the damper body 20, four fluid feeding holes 27 are located at regular intervals in the circumferential direction. Each fluid feeding hole 27 communicates with at least one slit 4. In the present embodiment, each fluid feeding hole 27 passes through the inner slit portion 42 of the slit 4 that is one of two slits 4 adjacent to each other in the circumferential direction, and passes through the outer slit portion 44 of the other one of the two slits 4. Each fluid feeding hole 27 communicates with a fluid feeding passage 12b in the support 12a of the housing 12. The viscous fluid 5 fed through the fluid feeding passage 12b is fed to the slits 4 through the fluid feeding hole 27.

The slits 4 have a slit width C (i.e., the dimension of each slit 4 in the radial direction), which is set so that the slit width C will not become 0 due to axial vibration of the rotating shaft 11, i.e., so that the inner ring 21, the outer ring 22, and the arc springs 23 will not come into contact with each other.

Figure 3:
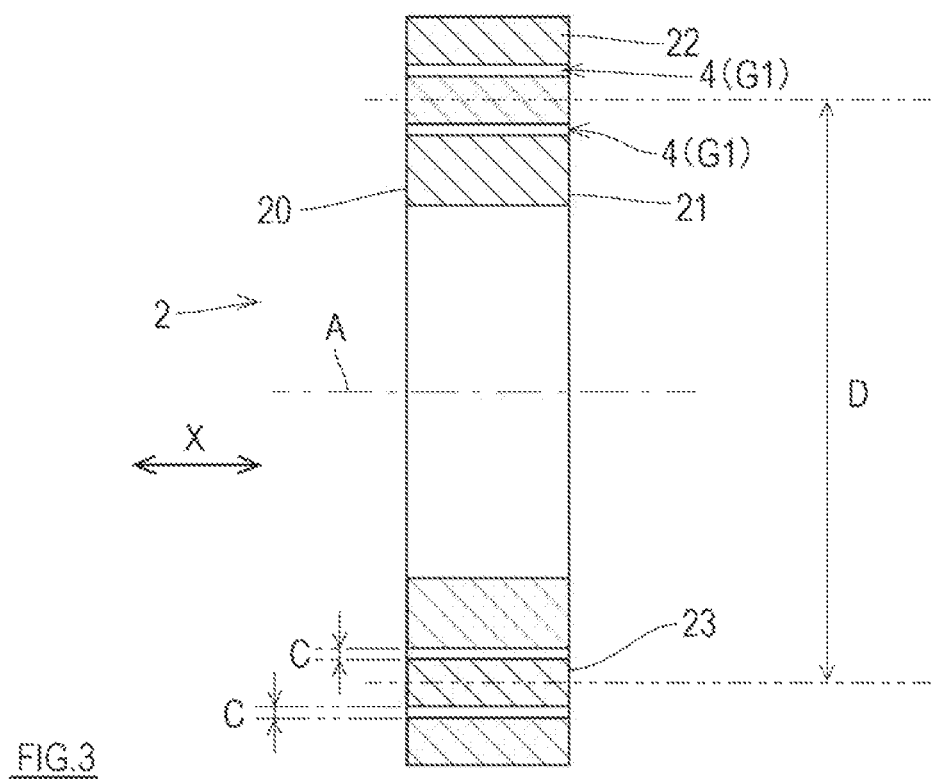
FIG. 3 is a sectional side view of the damper body, the view illustrating a slit width.

FIG. 3 is a sectional side view of the damper body 20, the view illustrating the slit width C. As shown in FIG. 3, the diameter of a circle that passes between the inner peripheral edge and the outer peripheral edge of each arc spring 23 at the middle between the inner peripheral edge and the outer peripheral edge in the radial direction is an "arc spring center diameter D". Desirably, the ratio of the slit width C (i.e., the dimension of each slit 4 in the radial direction) of at least one part of each slit 4 to the arc spring center diameter D (C/D) is not less than $\frac{1}{100}$. However, the slit width C of the damper 2 of the present disclosure is not limited to this example.

The sealers 30 are located on both sides of the damper body 20 in the axial direction X, respectively. Each sealer 30 is in the shape of a hollow discoid plate. The sealers 30 include sealing surfaces 31, respectively. The sealing surfaces 31 face open ends of the slits 4 in the axial direction X, with minute gaps (hereinafter, "end seal gaps G2") present between the sealing surfaces 31 and the open ends of the slits 4. That is, the end seal gaps G2 are located between the sealing surfaces 31 of the sealers 30 and the end surfaces of the damper body 20 in the axial direction X. Each slit 4 of the damper body 20 communicates with the end seal gaps G2. The end seal gaps G2 are filled with the viscous fluid 5.

First to fourth configuration examples described below each show a possible structure in which the end seal gaps G2 are located between the damper body 20 and the sealers 30. Each of FIGS. 4 to 7 is a sectional view of a part of the damper 2, the sectional view illustrating a configuration example of the end seal gaps G2.

Figure 4:
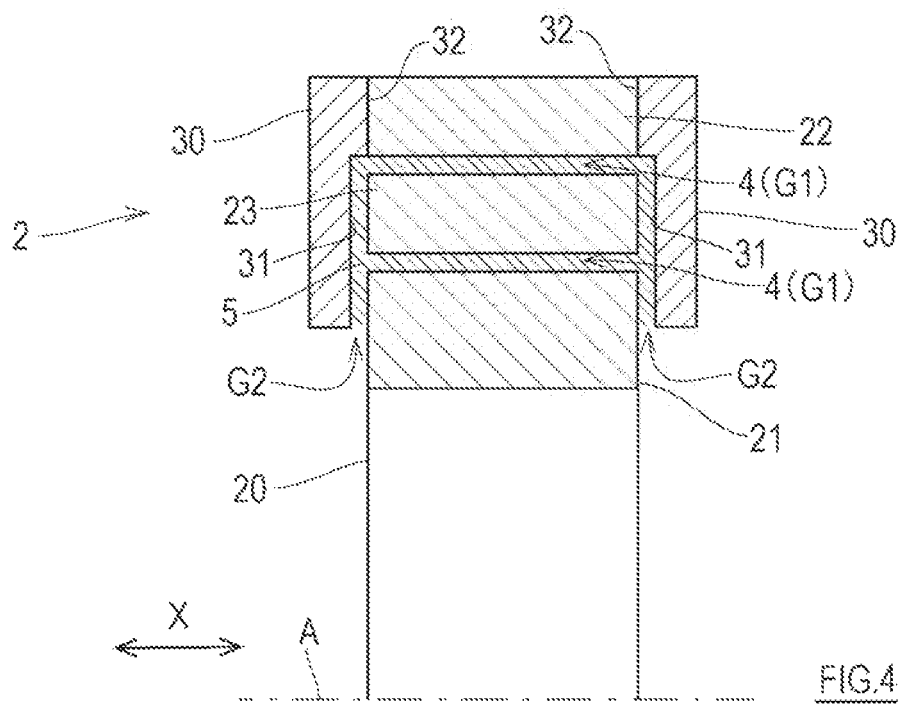
FIG. 4 is a sectional view of a part of the damper, the sectional view illustrating a first configuration example of end seal gaps.

In the first configuration example of the end seal gaps G2 shown in FIG. 4, coupling surfaces 32, which are located on the outer side of the respective sealers 30, are coupled to the outer ring 22 of the damper body 20. The sealing surfaces 31 are located on portions of the respective sealers 30, the portions facing the inner ring 21, the arc springs 23, and the slits 4 of the damper body 20. The sealing surfaces 31 are recessed, relative to the coupling surfaces 32, away from the damper body 20 in the axial direction X. In this manner, surfaces of the respective sealers 30, the surfaces facing the damper body 20, are stepped, and these steps surfaces form the end seal gaps G2.

In the second configuration example of the end seal gaps G2 shown in FIG. 5, coupling surfaces 33, which are located on the inner side of the respective sealers 30, are coupled to the inner ring 21 of the damper body 20. Portions of the respective sealers 30, the portions facing the outer ring 22, the arc springs 23, and the slits 4 of the damper body 20, serve as sealing surfaces 31, which are recessed, relative to the coupling surfaces 33, away from the damper body 20 in the axial direction X. In this manner, surfaces of the respective sealers 30, the surfaces facing the damper body 20, are stepped, and these stepped surfaces form the end seal gaps G2.

In the third configuration example of the end seal gaps G2 shown in FIG. 6, coupling surfaces 32, which are located on the outer side of the respective sealers 30, are coupled to the outer ring 22 of the damper body 20 via thin plates 35, respectively. In this manner, the sealers 30 and the damper body 20 are spaced apart from each other by the thin plates 35, thereby achieving the formation of the end seal gaps G2. The thickness of each thin plate 35 is the gap dimension of each end seal gap G2. Surfaces of the respective sealers 30, the surfaces being located inward of the coupling surfaces 32, serve as sealing surfaces 31. The sealing surfaces 31 face the inner ring 21, the arc springs 23, and the slits 4 of the damper body 20 in the axial direction X, with the end seal gaps G2 present between the sealing surfaces 31 and the inner ring 21, the arc springs 23, and the slits 4 of the damper body 20.

Figure 7:
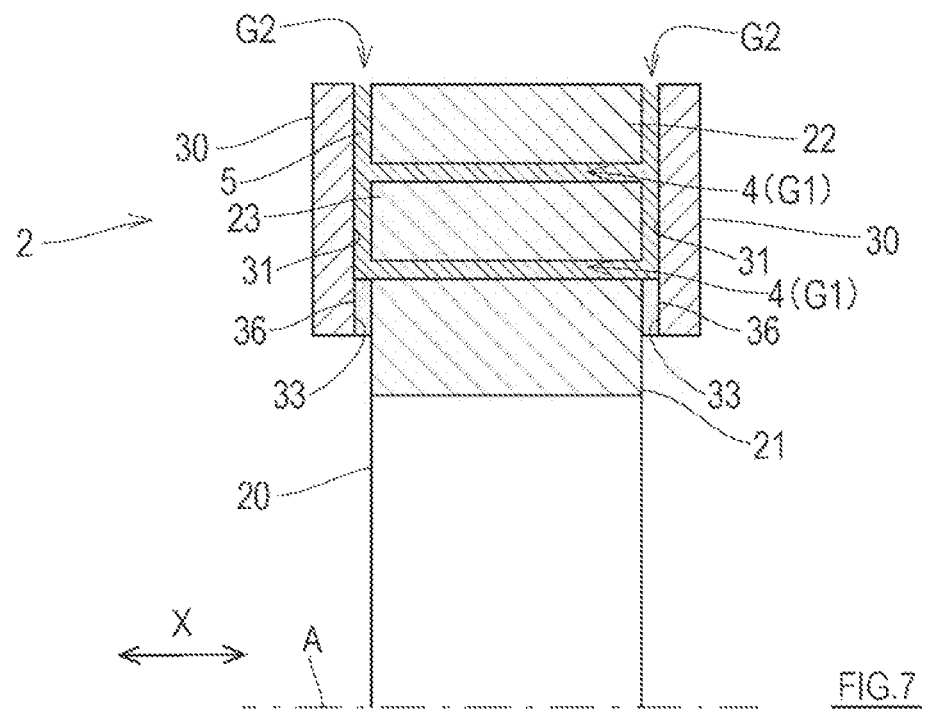
FIG. 7 is a sectional view of a part of the damper, the sectional view illustrating a fourth configuration example of the end seal gaps.

In the fourth configuration example of the end seal gaps G2 shown in FIG. 7, coupling surfaces 33, which are located on the inner side of the respective sealers 30, are coupled to the inner ring 21 of the damper body 20 via thin plates 36, respectively. In this manner, the sealers 30 and the damper body 20 are spaced apart from each other by the thin plates 36, thereby achieving the formation of the end seal gaps G2. The thickness of each thin plate 36 is the gap dimension of each end seal gap G2. Surfaces of the respective sealers 30, the surfaces being located outward of the coupling surfaces 33, serve as sealing surfaces 31. The sealing surfaces 31 face the outer ring 22, the arc springs 23, and the slits 4 of the damper body 20 in the axial direction X, with the end seal gaps G2 present between the sealing surfaces 31 and the outer ring 22, the arc springs 23, and the slits 4 of the damper body 20.

It is desirable to facilitate a flow of the viscous fluid 5 from the inside of the slits 4 into the end seal gaps G2 so as to effectively generate flow resistance of the viscous fluid 5 in the end seal gaps G2. In order to do so, the following first and second measures are adoptable. Both the first measure and the second measure may be applied at the same time. Alternatively, either one of the first measure or the second measure may be applied.

The first measure is to restrict the movement of the viscous fluid 5 in the slits 4 in the circumferential direction. In order to do so, the connecting portion 43 of each slit 4 includes a restrictor R. The restrictor R restricts the movement of the viscous fluid 5 in one of, or both, the circumferential direction and the radial direction. The movement of the viscous fluid 5 from the inner slit portion 42 to the outer slit portion 44 (or from the outer slit portion 44 to the inner slit portion 42) is restricted by the restrictor R, and consequently, a flow of the viscous fluid 5 from the inside of the slit 4 into the end seal gaps G2 is facilitated. As examples of the structure of the restrictor R, first to third examples are indicated below. Each of FIGS. 8 to 10 shows a part of the damper body 20 as seen in the axial direction X, and illustrates a configuration example of the restrictor R.

Figure 8:
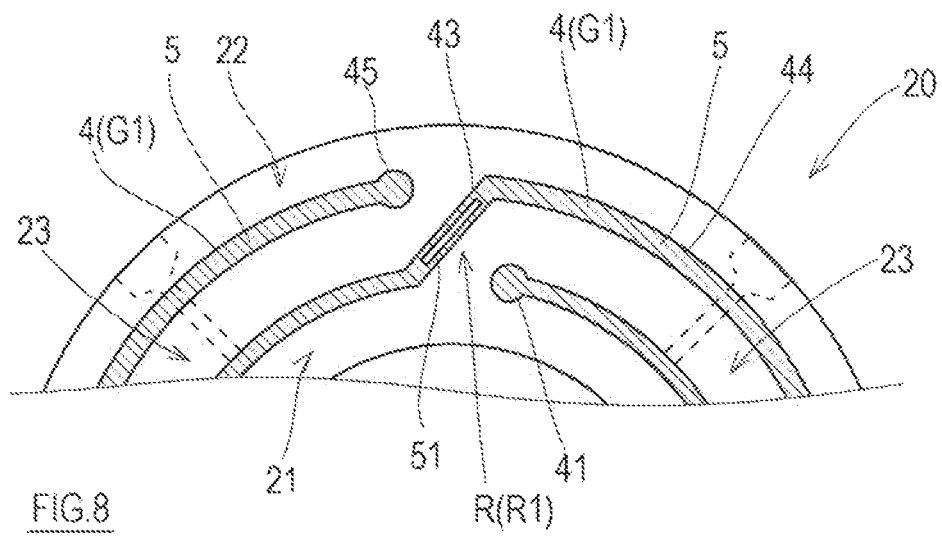
FIG. 8 shows a part of the damper body as seen in the axial direction, and illustrates a first example of a restrictor.

The restrictor R (R1) according to the first example shown in FIG. 8 includes a hinderer 51, which is located in a part of, or in the entirety of, the connecting portion 43. In this example, the inner slit portion 42, the connecting portion 43, and the outer slit portion 44 have substantially the same slit width. The hinderer 51 may be located along the slit walls of the connecting portion 43, or may be located at the middle of the slit width of the connecting portion 43. The hinderer 51 may be made of a highly thermal-resistant elastomer, or made of a metal. The hinderer 51 substantially reduces the cross-sectional area of a passage in the connecting portion 43 in both the circumferential direction and the radial direction.

Figure 9:
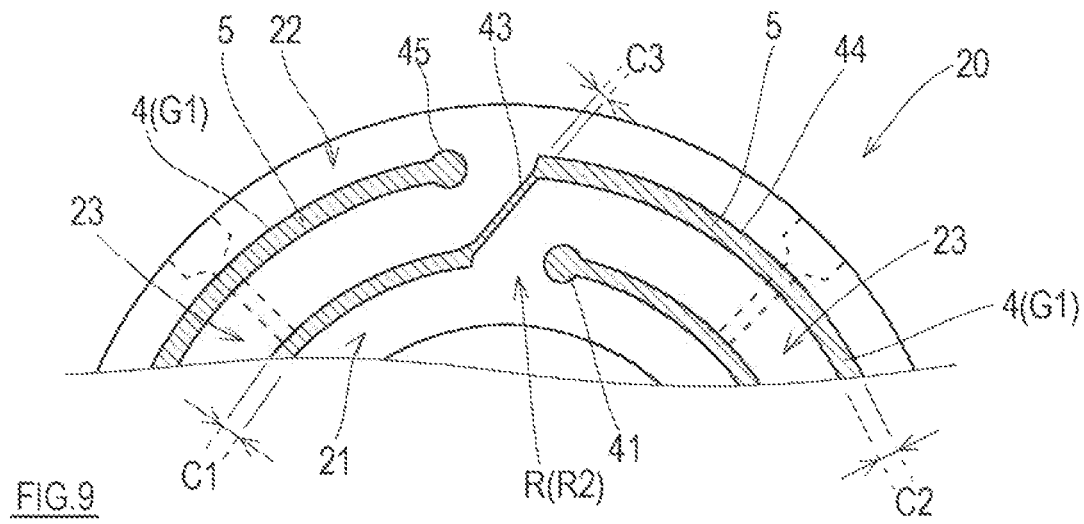
FIG. 9 shows a part of the damper body as seen in the axial direction, and illustrates a second example of the restrictor.

The restrictor R (R2) according to the second example shown in FIG. 9 has a third slit width C3. In this example, the inner slit portion 42 has a first slit width C1, and the outer slit portion 44 has a second slit width C2. The first slit width C1 and the second slit width C2 may be the same. The third slit width C3 is less than the first slit width C1 and the second slit width C2. The restrictor R2 may be a part of the connecting portion 43, or the entire connecting portion 43 may be configured as the restrictor R2. The restrictor R2 thus configured restricts the flow of the viscous fluid 5 between the inner slit portion 42 and the outer slit portion 44.

Figure 10:
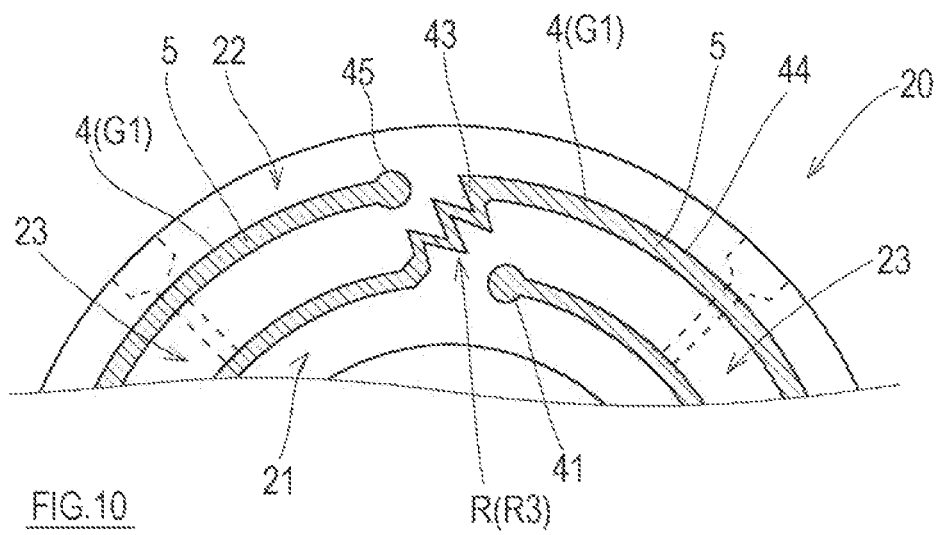
FIG. 10 shows a part of the damper body as seen in the axial direction, and illustrates a third example of the restrictor.

The restrictor R (R3) according to the third example shown in FIG. 10 is neither a linear passage nor a smooth curved passage, but includes at least one bent portion. The restrictor R (R3) may include a zigzag passage with two or more bent portions (i.e., a straight passage bent at an acute angle multiple times). The restrictor R3 may be a part of the connecting portion 43, or the entire connecting portion 43 may be configured as the restrictor R3. The restrictor R3 thus configured hinders the movement of the viscous fluid 5 from the inner slit portion 42 to the outer slit portion 44 (or from the outer slit portion 44 to the inner slit portion 42).

The second measure is to prevent a reverse flow of the viscous fluid 5 from the inside of the slits 4 into the fluid feeding holes 27. In order to do so, a connecting portion between each fluid feeding hole 27 and its corresponding slit 4 (specifically, the outer slit portion 44 thereof) includes a reverse flow preventer 28 (see FIG. 1). Since the viscous fluid 5 pushed out of the slit 4 due to vibration during rotation of the rotating shaft 11 is hindered from reversely flowing into the fluid feeding hole 27, a flow of the viscous fluid 5 into the end seal gaps G2 is facilitated. In the present embodiment, the reverse flow preventer 28 serves as a "restrictor" that restricts a flow of the viscous fluid 5. Examples of the restrictor include: a self-forming restrictor configured such that the cross-sectional area of the passage of the fluid feeding hole 27 decreases gradually; and an orifice restrictor realized by an orifice component located in the fluid feeding hole 27. In a case where each reverse flow preventer 28 is a restrictor, a total cross-sectional area of the restrictor passages is desirably equal to, or less than, the cross-sectional area of the outlet passages of the end seal gaps G2.

As described above, the damper 2 according to the present embodiment is a damper that is located between the rotating shaft 11 and the support (the housing 12), the damper serving to damp vibration of the rotating shaft 11 and to center the rotating shaft 11. The damper 2 includes the damper body 20, the sealers 30, and the viscous fluid 5. The damper body 20 includes: the inner ring 21 and the outer ring 22, which are concentrically located; the arc springs 23, which are located side by side in the circumferential direction between the inner ring 21 and the outer ring 22; and the slits 4, which separate the inner ring 21, the outer ring 22, and the arc springs 23 from each other. The damper body 20 is overall cylindrical. The arc springs 23 include the first arc spring and the second arc spring that are located side by side in the circumferential direction. Each slit 4 includes: the inner slit portion 42, which separates the first arc spring and the inner ring 21 from each other; the outer slit portion 44, which separates the second arc spring and the outer ring 22 from each other; and the connecting portion 43, which connects the inner slit portion 42 and the outer slit portion 44. The connecting portion 43 includes the restrictor R (R1, R2, R3), which restricts the movement of the viscous fluid 5 between the inner slit portion 42 and the outer slit portion 44.

The restrictor R1 may include the hinderer 51, which is located in a part of, or in the entirety of, the connecting portion 43. The hinderer 51 hinders a flow of the viscous fluid 5 in one of, or both, the circumferential direction and the radial direction.

Alternatively, the restrictor R2 may have the third slit width C3, which is less than the first slit width C1 and the second slit width C2. In this case, the inner slit portion 42 has the first slit width C1, and the outer slit portion 44 has the second slit width C2.

Alternatively, the restrictor R3 may include at least one bent portion.

The damper 2 configured as above includes a fluid film that is continuous in the slits 4 and the end seal gaps G2. When the rotating shaft 11 vibrates due to its rotation, pressure derived from the viscosity of the viscous fluid 5 occurs in the fluid film in the slits 4 (i.e., in the squeeze gaps G1). Accordingly, vibration damping (so-called squeeze damping) occurs. The arc springs 23 support the rotating shaft 11 softly, and center the rotating shaft 11. Also, when the rotating shaft 11 vibrates due to its rotation, viscous resistance occurs in the fluid film in the end seal gaps G2. Consequently, vibration damping by energy dissipation (so-called dashpot damping) occurs. While the rotating shaft 11 is rotating, in each slit 4, a flow of the viscous fluid 5 from the inner slit portion 42 to the outer slit portion 44 (or from the outer slit portion 44 to the inner slit portion 42) is restricted by the restrictor R (R1, R2, R3). Accordingly, the viscous fluid 5 in the slits 4 is led to the end seal gaps G2, thereby causing vibration damping. Therefore, even in a case where the slit width C of the slits 4 is set greater than the slit width in conventional squeeze film dampers and thereby the squeeze damping effect exerted by the slits 4 is lowered, the dashpot damping effect exerted by the end seal gaps G2 will compensate for the insufficiency in the vibration damping effect, or even improve the vibration damping effect.

In the damper 2 configured as above, the damper body 20 may include at least one fluid feeding hole 27, which extends in the radial direction from the outer surface of the outer ring 22, communicates with at least one of the slits 4, and feeds the viscous fluid 5 to the at least one of the slits 4. The fluid feeding hole 27 may include the reverse flow preventer 28, which prevents a reverse flow of the viscous fluid 5 from the at least one of the slits 4 to the fluid feeding hole 27. In the above-described embodiment, the reverse flow preventer 28 is a restrictor that restricts a flow of the viscous fluid 5.

In the damper 2 configured as above, since the reverse flow of the viscous fluid 5 into the fluid feeding hole 27 from the inside of the slit(s) 4 is restricted, the viscous fluid 5 in the slit(s) 4 is led to the end seal gaps G2 due to vibration of the rotating shaft 11, and this makes it possible to cause vibration damping effectively.

As described above, in the damper 2 according to the present embodiment, since vibration damping occurs in the end seal gaps G2, even in a case where the slit width C of the slits 4 is set greater than the slit width in conventional squeeze film dampers and thereby the squeeze damping effect exerted by the slits 4 is lowered, the dashpot damping effect exerted by the end seal gaps G2 will compensate for the insufficiency in the vibration damping effect, or even improve the vibration damping effect. In other words, in the damper 2 according to the present embodiment, the slit width C of the slits 4 can be increased compared to the slit width in conventional squeeze film dampers while maintaining or improving vibration damping characteristics compared to conventional squeeze film dampers.

As described above, the slit width C of the slits 4 can be increased to such an extent that the damping characteristics of the damper 2 are hardly affected by the static eccentricity and vibration amplitude of the rotating shaft 11. As a result of the increase in the slit width C, the dependence of the damping characteristics of the damper 2 on the static eccentricity of the rotating shaft 11 is lowered, which makes it easier to properly design the damper 2. Also, as a result of the increase in the slit width C, the dependence of the damping characteristics of the damper 2 on the vibration amplitude of the rotating shaft 11 is lowered, which makes it possible to suppress the occurrence of an unwanted phenomenon such as a jump phenomenon caused by a rapid change in the vibration of the rotating shaft 11. Moreover, in a case where the slits 4 are machined by wire-cut electrical discharge machining, the machining current can be increased and thereby the machining time can be shortened, which consequently makes it possible to reduce the manufacturing cost of the damper 2.

In the damper 2 according to the above embodiment, the sealers 30 include the coupling surfaces 32 or 33, respectively, and further include the sealing surfaces 31, respectively. The coupling surfaces 32 or 33 are coupled to the outer ring 22, or the inner ring 21, of the damper body 20. The sealing surfaces 31 are recessed relative to the coupling surfaces 32 or 33.

As described above, surfaces of the respective sealers 30, the surfaces facing the damper body 20, are stepped, and these stepped surfaces form the end seal gaps G2. In this manner, the formation of the end seal gaps G2 with a stable gap dimension is achieved. Alternatively, surfaces of the damper body 20, the surfaces facing the respective sealers 30, may be stepped, and these stepped surfaces may form the end seal gaps G2.

The sealers 30 may be fixed to the outer ring 22, or the inner ring 21, of the damper body 20 via the thin plates 35 or 36, respectively, the thin plates each having a thickness corresponding to the gap dimension of each of the end seal gaps G2.

In the above case where the end seal gaps G2 are formed by the thin plates 35 or 36, respectively, the gap dimension of the end seal gaps G2 can be readily adjusted by the thickness of the thin plates 35 or 36.

In the damper 2 according to the present embodiment, the diameter of a circle that passes between the inner peripheral edge and the outer peripheral edge of each of the arc springs 23 at the middle between the inner peripheral edge and the outer peripheral edge in the radial direction is an arc spring center diameter D, and the ratio of the slit width C of at least one part of each slit 4 to the arc spring center diameter D (the slit width C/the arc spring center diameter D) is not less than $1/100$.

The slit width C, which is set as above, is sufficiently greater than the slit width of conventional squeeze film dampers (the conventional slit width is, for example, 0.2 mm as disclosed in Patent Literature 1). In the damper 2 having such a slit width C, at the time of machining the slits 4 in a cylindrical raw material of the damper body 20 by wire-cut electrical discharge machining, the wire diameter can be increased compared to the conventional art, and thereby the machining current can be increased. Consequently, the machining time is shortened, which consequently makes it possible to reduce the manufacturing cost of the damper 2. In addition, the damper 2 having such a slit width C can suppress influences of the static eccentricity and vibration amplitude on the vibration damping performance. If the dependence of the damping characteristics of the damper 2 on the static eccentricity of the rotating shaft 11 is lowered, proper designing of the damper 2 becomes easier. Also, if the dependence of the damping characteristics of the damper 2 on the vibration amplitude of the rotating shaft 11 is lowered, the occurrence of an unwanted phenomenon such as a jump phenomenon caused by a rapid change in the vibration of the rotating shaft 11 can be suppressed.

Although the preferred embodiment (and its variations) is as described above, specific structural and/or functional details of the above-described embodiment can be modified without departing from the scope of the present disclosure, and such modifications would fall within the scope of the present disclosure. The above-described configurations can be modified, for example, as described below.

Figure 11:
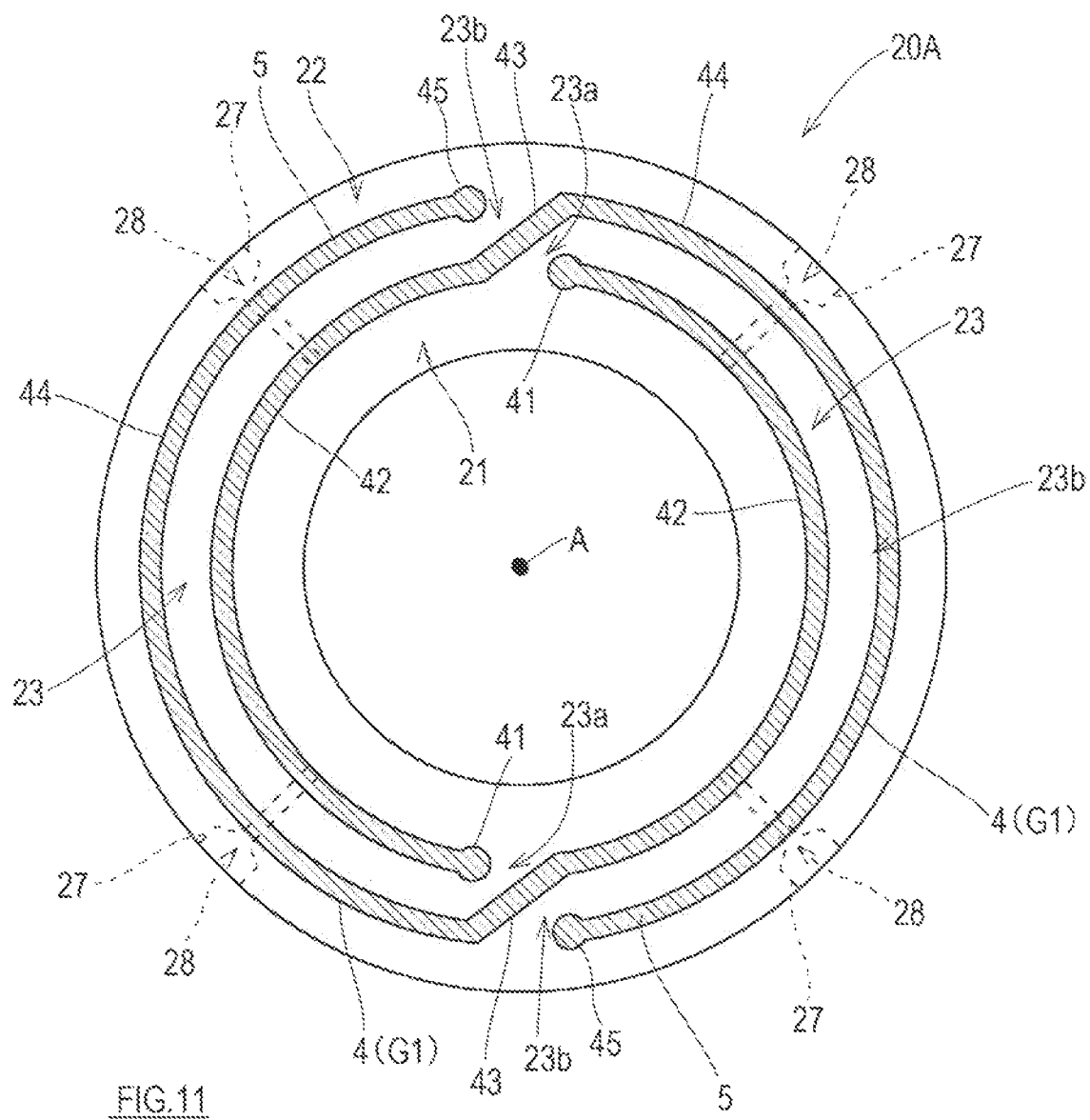
FIG. 11 shows another damper body as seen in the axial direction, including a different number of arc springs and a different number of slits.

For example, in the damper 2 according to the above-described embodiment, the number of arc springs 23 is four, and also, the number of slits 4 is four. However, the number of arc springs 23 and the number of slits 4 are not limited to four. For example, as shown in FIG. 11, a damper body 20A, in which two arc springs 23 are located side by side in the circumferential direction and the number of slits 4 is two, is adoptable in the damper 2.

REFERENCE SIGNS LIST 2, 2A: damper
4: slit
5: viscous fluid
11: rotating shaft
12: housing (support)
12b: fluid feeding passage
13: bearing
20, 20A: damper body
20A: damper body
21: inner ring
22: outer ring
23: arc spring
27: fluid feeding hole
28: reverse flow preventer
30: sealer
31: sealing surface
32, 33: coupling surface
35, 36: thin plate
41: first end hole
42: inner slit portion
43: connecting portion
44: outer slit portion
45: second end hole
51: hinderer
C, C1 to C3: slit width
D: arc spring center diameter
G1: squeeze gap
G2: end seal gap
R, R1 to R3: restrictor
X: axial direction

The invention claimed is:

1. A damper comprising:
a damper body that is cylindrical, the damper body including
an inner ring and an outer ring that are concentrically located,
arc springs that are located side by side in a circumferential direction between the inner ring and the outer ring, and
slits that separate the inner ring, the outer ring, and the arc springs from each other;
sealers located on both sides of the damper body in an axial direction, respectively, the sealers including sealing surfaces, respectively, the sealing surfaces facing open ends of the slits in the axial direction, with gaps present between the sealing surfaces and the open ends of the slits; and
a viscous fluid that fills the slits and the gaps, wherein
the arc springs include a first arc spring and a second arc spring that are located side by side in the circumferential direction,
each of the slits includes:
an inner slit portion that separates the first arc spring and the inner ring from each other;
an outer slit portion that separates the second arc spring and the outer ring from each other; and
a connecting portion that connects the inner slit portion and the outer slit portion,
the connecting portion includes a restrictor that restricts movement of the viscous fluid between the inner slit portion and the outer slit portion, and
the restrictor includes a hinderer that is located in a slit width of the connecting portion and extends along an extending direction of the connecting portion, and that hinders a flow of the viscous fluid in one of, or both, the circumferential direction and a radial direction.

2. The damper according to claim 1, wherein
the damper body includes at least one fluid feeding hole that extends in a radial direction from an outer surface of the outer ring, communicates with at least one of the slits, and feeds the viscous fluid to the at least one of the slits, and
the fluid feeding hole includes a reverse flow preventer that prevents a reverse flow of the viscous fluid from the at least one of the slits to the fluid feeding hole.

3. The damper according to claim 2, wherein
the reverse flow preventer is a restrictor that restricts a flow of the viscous fluid.

4. The damper according to claim 2, wherein
the sealers, which include the sealing surfaces, respectively, further include coupling surfaces, respectively,
the coupling surfaces are coupled to the outer ring, or the inner ring, of the damper body, and
the sealing surfaces are recessed relative to the coupling surfaces.

5. The damper according to claim 2, wherein
the sealers are coupled to the outer ring, or the inner ring, of the damper body via plates, respectively, the plates each having a thickness corresponding to a gap dimension of each of the gaps.

6. The damper according to claim 1, wherein
a diameter of a circle that passes between an inner peripheral edge and an outer peripheral edge of each of the arc springs at a middle between the inner peripheral edge and the outer peripheral edge in a radial direction is an arc spring center diameter, and
a ratio of a slit width of at least one part of each slit to the arc spring center diameter (the slit width/the arc spring center diameter) is not less than $1/100$.

7. The damper according to claim 1, wherein the hinderer is located in a passage of the connecting portion and reduces the cross-sectional area of the passage in both the circumferential direction and the radial direction.

8. The damper according to claim 1, wherein the hinderer is located along slit walls of the connecting portion.

9. The damper according to claim 1, wherein the hinderer is located at a middle of the slit width of the connecting portion.

* * * * *